United States Patent [19]

Cozic

[11] Patent Number: 5,081,452
[45] Date of Patent: Jan. 14, 1992

[54] SELF-HEALING SYSTEM FOR A RING LINK WITH SPARE RING LINK MEANS

[75] Inventor: Jean Yves Cozic, Lannion, France
[73] Assignee: Alcatel Cit, Paris, France
[21] Appl. No.: 711,711
[22] Filed: Jun. 7, 1991

Related U.S. Application Data

[63] Continuation of Ser. No. 448,466, Dec. 11, 1989, abandoned.

[30] Foreign Application Priority Data

Dec. 12, 1988 [FR] France .................. 88 16316

[51] Int. Cl.⁵ ............................................. H04B 3/00
[52] U.S. Cl. ............................. 340/825.5; 370/85.12
[58] Field of Search ................. 340/825.01, 825.05, 340/825.06, 825.16; 370/85.5, 85.9, 85.11, 85.12, 85.14, 85.15; 371/8.1, 8.2, 11.1, 11.2

[56] References Cited

U.S. PATENT DOCUMENTS

| | | | |
|---|---|---|---|
| 4,417,242 | 11/1983 | Bapst et al. | 340/825.05 |
| 4,723,241 | 2/1988 | Grobel et al. | 371/11.2 |
| 4,769,807 | 9/1988 | Niwa et al. | 340/825.05 |
| 4,777,330 | 10/1988 | Nakayashiki et al. | 371/11.2 |
| 4,847,610 | 7/1989 | Ozawa et al. | 340/825.05 |
| 4,862,158 | 8/1989 | Keller et al. | 340/825.05 |
| 4,905,230 | 2/1990 | Madge et al. | 340/825.05 |
| 4,937,823 | 6/1990 | Bekki et al. | 371/11.2 |

FOREIGN PATENT DOCUMENTS 0086577  8/1983  European Pat. Off. .

OTHER PUBLICATIONS

Patent Abstracts of Japan, vol. 8, No. 226 (E-272) [1663], Oct. 17, 1984; & JP-A-59107665 (Hitachi: Seisakusho K.K.), 6/21/1985.

Primary Examiner—Donald J. Yusko
Assistant Examiner—Dervis Magistre
Attorney, Agent, or Firm—Sughrue, Mion, Zinn, Macpeak & Seas

[57] ABSTRACT

The stations (S1 to SN) are interconnected in series by a ring (A), and the system of the invention includes a spare ring (AS) interconnecting the stations in series, together with two self-healing circuits (CAM, CAV) in each station coupler (CS) between the two connectors (8, 9) of the coupler and its insertion relay (RI). The couplers are interconnected by cords (10; 11) each containing the ring (A), the spare ring (AS), and two detection links (12, 13). Each self-healing circuit includes a relay (6) and a relay control circuit (7) connected to a detection link whose other end is connected to ground in another self-healing circuit. Each relay (6) has fixed contacts (a1, a2, b1, b2), a first moving contact (C1) connected to the insertion relay (RI), and a second moving contact (C2). The second moving contacts (C2) of the two self-healing circuits (CAM, CAV) in the same coupler are interconnected by a spare link (L). In each self-healing circuit, the moving contacts co-operate with the fixed contacts so that in a rest position they interconnect the insertion relay (RI) with the ring (A) and the spare link (L) with the spare ring (AS), and in a working position they connect the insertion relay (RI) to the spare link (L).

2 Claims, 6 Drawing Sheets

RING-CONNECTED STATIONS

PRIOR ART

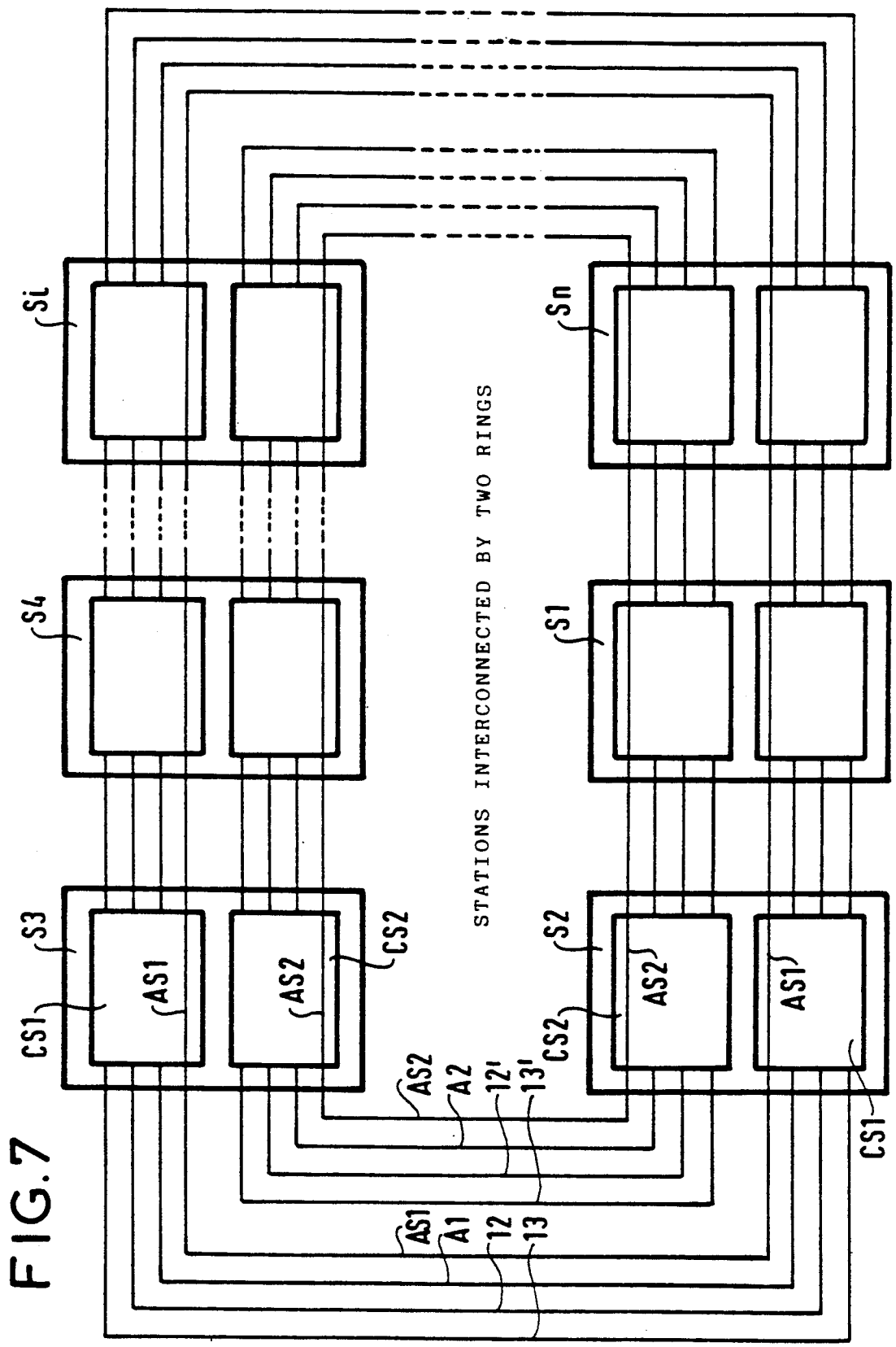

SELF-HEALING SYSTEM FOR A RING LINK WITH SPARE RING LINK MEANS

This is a continuation of application Ser. No. 07/448,466 filed Dec. 11, 1989, now abandoned.

The invention relates to self-healing a ring link used for interconnecting a large number of stations.

BACKGROUND OF THE INVENTION

In a ring link, the various stations S1 to Sn (FIG. 1) are interconnected in series by a ring A. A message transmitted by any one station transits through each of the other stations connected to the ring prior to returning to the transmitting station. The destination station for the message copies it as it goes past and retransmits the message over the ring plus various bits including a "message-copied" flag.

Each station may be inserted on the ring or withdrawn therefrom. When a station is withdrawn, as shown diagrammatically in FIG. 2, ring continuity is ensured by an insertion relay RI carried by the coupler card 1 of the station, said coupler card being provided with a transmission circuit 2 and a reception circuit 3. The coupler card is connected to the ring A by means of connectors 4 and 5, with the ring being constituted between stations (FIG. 1) by a cord provided with a connector at each end. At rest, the insertion relay serves firstly to ensure metallic continuity of the ring and secondly to loop the transmission circuit 2 back onto the reception circuit 3.

This architecture suffers from a major drawback: when a coupler card or a cord is withdrawn, the ring opens and ceases to operate until the situation is restored, i.e. until the coupler card or the cord is put back into place. This cannot be tolerated when the maximum network down-time in a network using this type of coupler is required to be less than one second.

The object of the invention is to mitigate this defect by limiting the down-time of the ring to about 100 milliseconds.

SUMMARY OF THE INVENTION

The present invention provides a self-healing system for a ring link interconnecting a plurality of stations, said link including at least one ring and at least one spare ring, and each station including, for each ring, a coupler having an insertion relay, an upstream connector, and a downstream connector, said insertion relay being situated between said upstream and downstream connectors with which it is connected, a cord containing said link and provided at each end with a connector serving to interconnect a downstream connector of one station with an upstream connector of a following station, wherein the system comprises, for each ring, a spare ring that conveys no information in normal operation, each coupler including an upstream self-healing circuit between its upstream connector and its insertion relay, a downstream self-healing circuit between its insertion relay and its downstream connector, and a spare link interconnecting the upstream and downstream self-healing circuits, each cord interconnecting two stations further containing the spare ring and two detection links, each self-healing circuit including a relay and a relay control circuit, said relay having a first moving contact connected to the insertion relay, a second moving contact connected to the spare link, a first fixed contact connected to the ring, second and third fixed contacts which are interconnected, and a fourth fixed contact connected to the spare ring, one of the two detection links in a cord being connected in an upstream self-healing circuit both to a positive potential via a resistor and to the control circuit, and being connected in a downstream self-healing circuit to ground, the other detection link in an upstream self-healing circuit to ground, and in a downstream self-healing circuit both to a positive potential via a resistor and to the control circuit, each first moving contact in each self-healing circuit co-operating, when in the rest position, with the first fixed contact in order to connect the ring to the insertion relay, while the second moving contact co-operates, when in the rest position, with the fourth fixed contact in order to connect the spare ring to the spare link, and the first moving contact in each self-healing circuit co-operating, in the working position, with the second fixed contact, and with the second moving contact co-operating in the working position with the third fixed contact, thereby connecting the insertion relay to the spare link.

The invention is applicable to any network in which stations are interconnected by at least one ring. When stations are interconnected by two rings, the invention provides for two spare rings, with each normal ring being backed up by its own spare ring.

BRIEF DESCRIPTION OF THE DRAWINGS

An embodiment of the invention is described by way of example with reference to the accompanying drawings, in which:

FIG. 7 shows a two-ring network.

FIGS. 1 and 2 relate to the prior art as described above.

DETAILED DESCRIPTION

Figure 1:
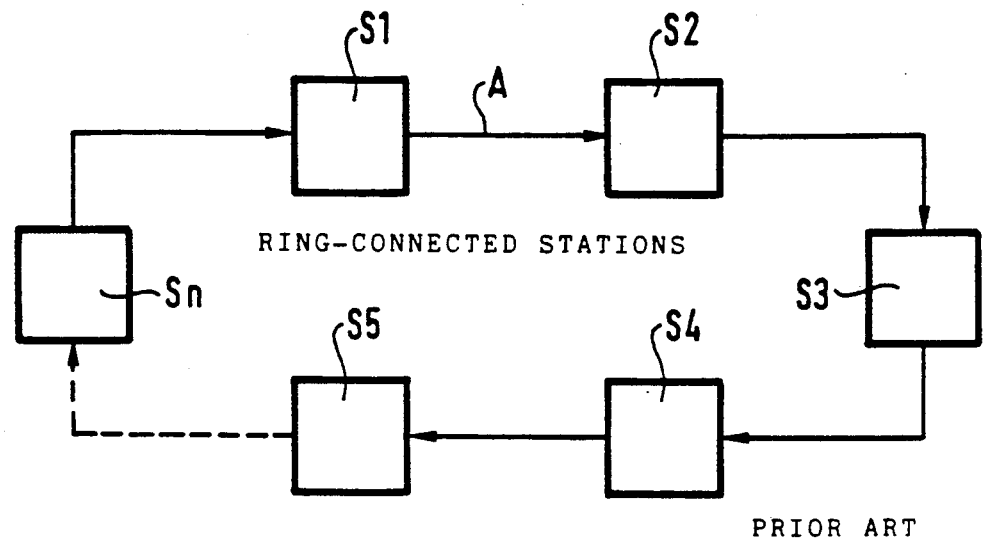
FIG. 1 shows a conventional type of ring network.
Figure 2:
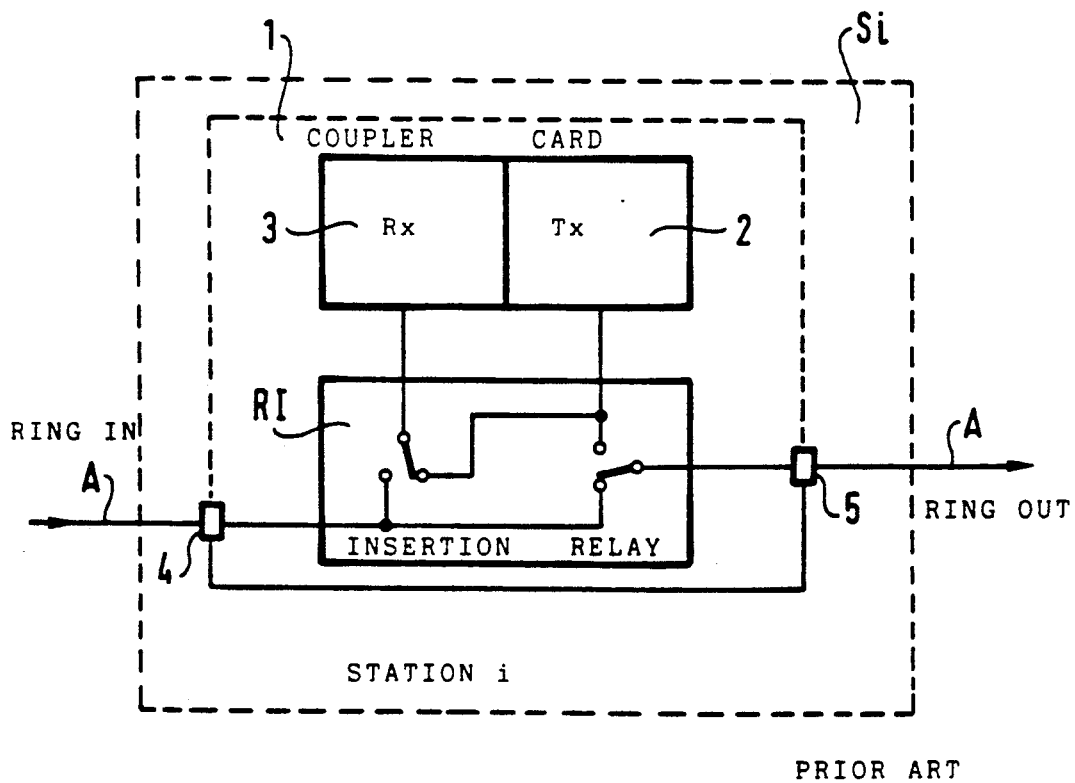
FIG. 2 is a block diagram of one of the stations in the network of FIG. 1.
Figure 3:
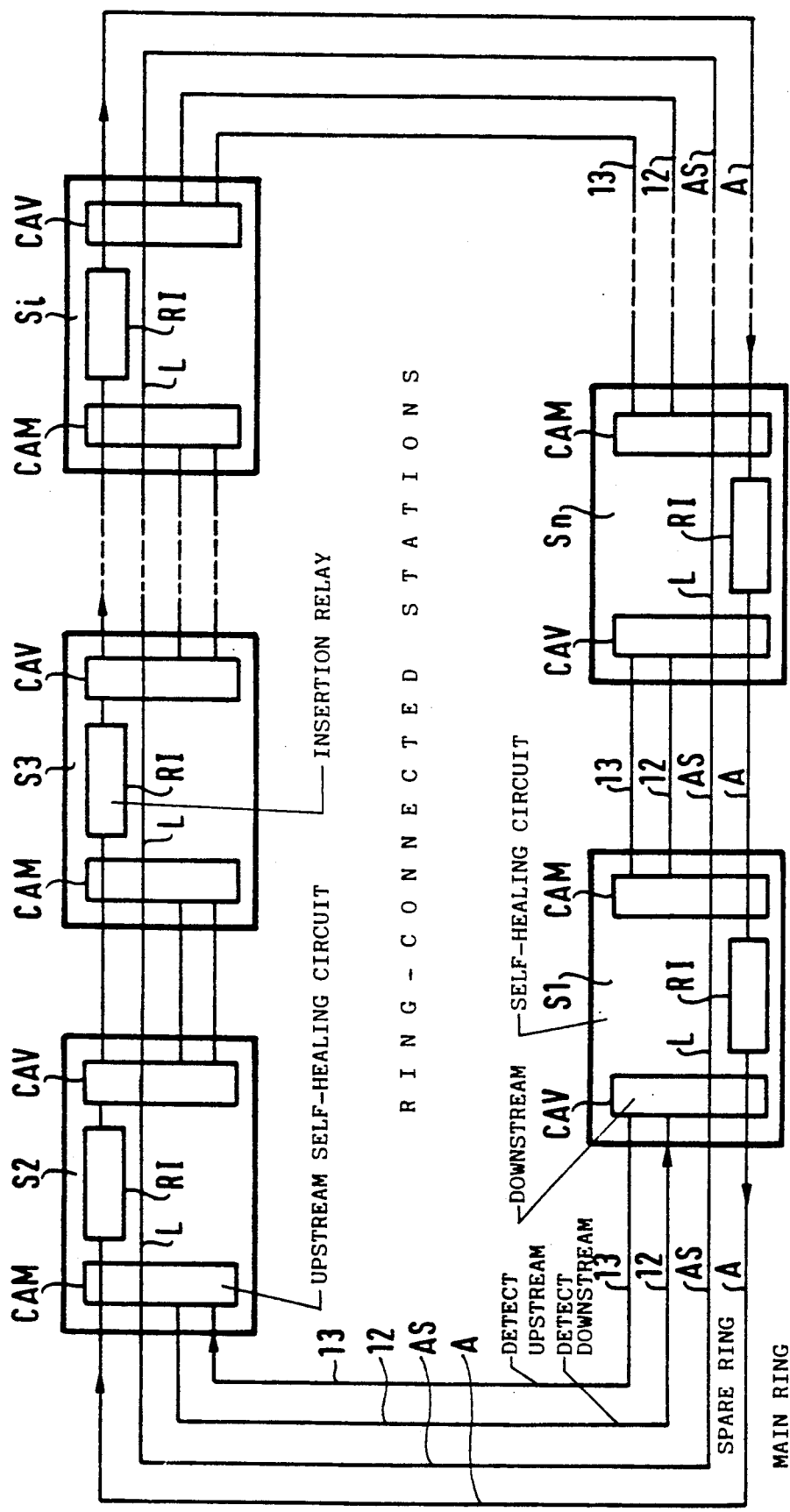
FIG. 3 shows a ring network including the self-healing system of the invention.

FIG. 3 is a block diagram of a ring network including the self-healing system of the invention. In this figure, the network comprises n stations S1 to Sn interconnected in series by a ring A which corresponds to the ring A of FIG. 1, and also by a spare ring AS. Each station coupler also includes transmission and reception circuits (not shown) and an insertion relay RI, an upstream self-healing circuit CAM, and a downstream self-healing circuit CAV. The upstream self-healing circuit CAM of a station Si is connected to the downstream self-healing CAV of the preceding station Si-1 by two detection links 12 and 13. The link 13 serves to inform the station Si that the coupler in the preceding station Si-1 is present, and the link 12 serves to inform the station Si-1 that the coupler in the station Si is present, in a manner described in greater detail below with reference to FIG. 4. In each station, the upstream self-healing circuit CAM, the insertion relay RI, and the downstream self-healing circuit CAV provide continuity for the ring A between the inlet and the outlet of the station. Continuity of the spare ring AS is provided by the upstream and downstream self-healing circuits and by a spare link L which interconnects the upstream and downstream self-healing circuits in each coupler. Between stations, the detection links 12 and 13, the ring A, and the spare ring AS are constituted by a cord provided with connectors at its ends for connection to the station couplers. When all of the stations are operating and none of the cords is broken or missing, the spare ring AS does not convey any information, while in each station continuity is ensured both for the ring A and for the spare ring AS.

Figure 4:
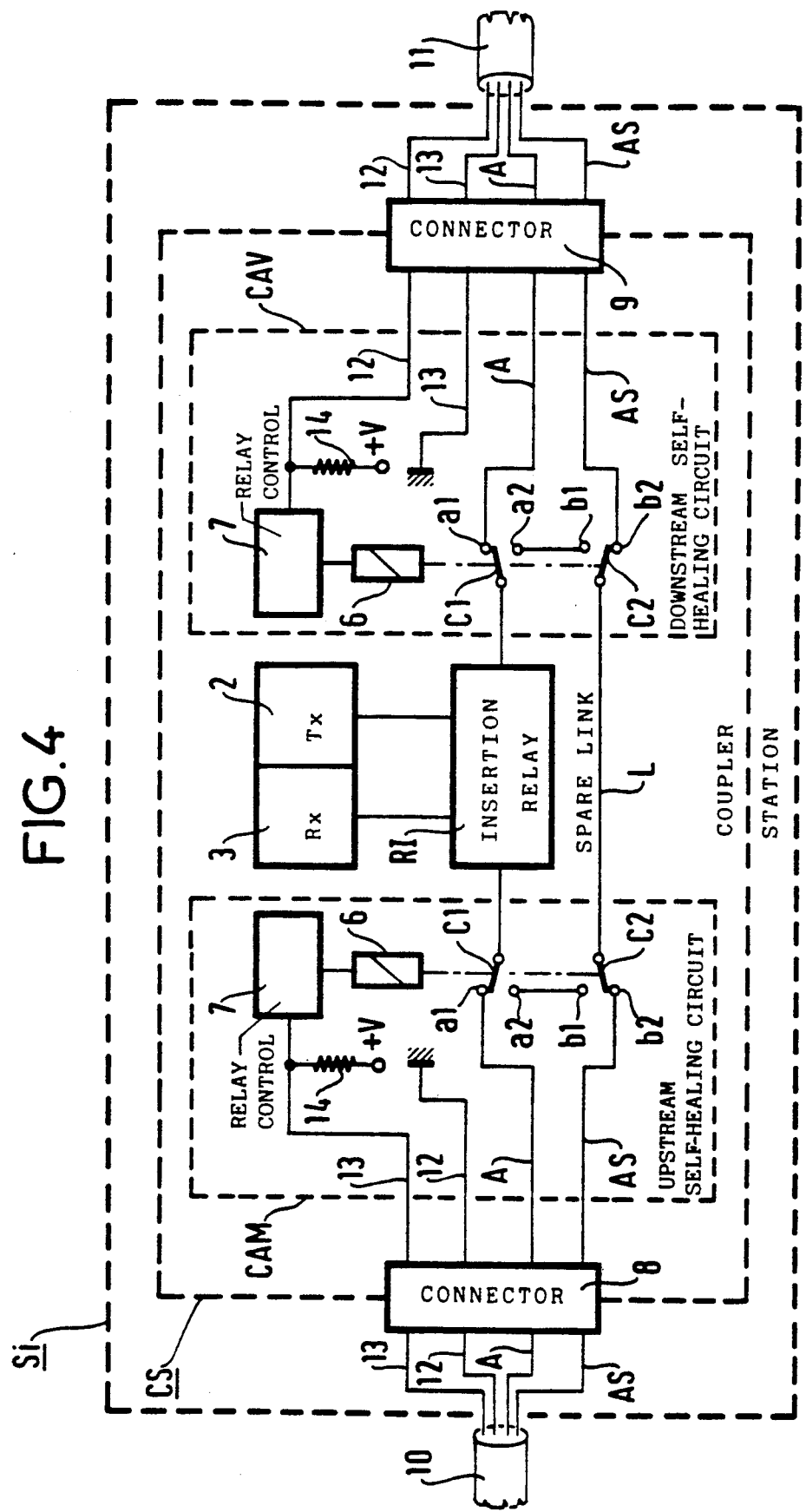
FIG. 4 shows a coupler for a FIG. 3 station.

FIG. 4 shows the coupler CS of a station Si in FIG. 3, with the coupler being constituted by a removeable card. The coupler is connected via an upstream connector 8 and a cord 10 to the coupler of the preceding station Si-1, and via a downstream coupler 9 and a cord 11 to the coupler of the following station Si+1. As in FIG. 3, each cord contains the ring A, the spare ring AS, and the two detection links 12 and 13. The coupler CS includes the transmission circuit 2, the reception circuit 3, the insertion relay RI, an upstream self-healing circuit CAM, and a downstream self-healing circuit CAV.

Each self-healing circuit includes a relay 6 and a relay control circuit 7. The relay 6 has two moving contacts C1 and C2, and four fixed contacts a1, a2, b1, and b2, with fixed contacts a2 and b1 being interconnected. Moving contact C1 is connected to the insertion relay RI, and moving contact C2 is connected to the spare link L.

The cord 10 and the upstream self-healing circuit CAM are connected together via the upstream connector 8. The spare ring AS is connected to fixed contact b2, the ring A is connected to fixed contact a1, detection link 12 is connected to ground, and detection link 13 is connected firstly to the control circuit 7 and secondly to a positive potential +V via a resistor 14. In the preceding station Si-1, the detection link 13 is connected to ground and the detection link 12 is connected to the control circuit 7, and via a resistor 14 to a positive potential +V in the downstream self-healing circuit CAV of said preceding station.

The cord 11 and the downstream self-healing circuit CAV are interconnected via the downstream connector 9. The spare ring AS is connected to fixed contact b2, the ring A is connected to fixed contact a1, the detection link 13 is connected to ground, and the detection link 12 is connected firstly to the control circuit 7 and secondly to a positive potential +V via a resistor 14. In the following station Si+1 the detection link 12 is connected to ground and the detection link 13 is connected to the control circuit 7 and via a resistor 14 to a positive potential +V in the upstream self-healing circuit CAM of said following station.

In normal operation, the topology of the ring network is as shown in FIG. 3. In each station, the ring A is connected to the insertion relay RI via the moving contacts C1 of the relays 6 in the upstream and downstream self-healing circuits, with said moving contacts C1 co-operating with the fixed contacts a1 in order to ensure metallic continuity for the ring A. The contacts of the insertion relay RI situated between the moving contacts C1 allow the station to be inserted or withdrawn from the ring. Continuity of the spare ring AS is ensured by the spare link L and by the moving contacts C2 which co-operate with the fixed contacts b2, with the spare link L interconnecting said moving contacts C2.

Figure 5:
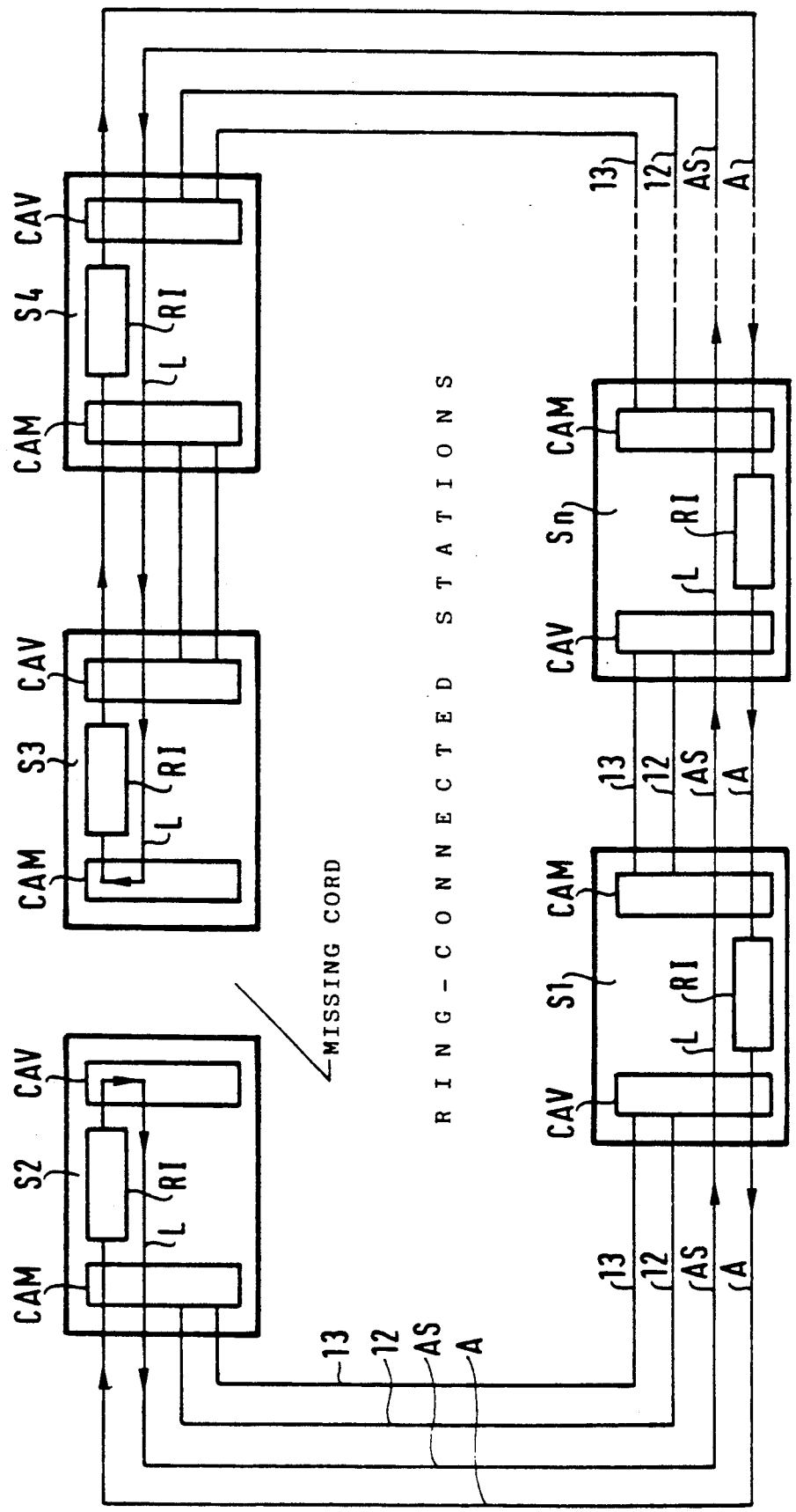
FIG. 5 shows the topology of the FIG. 3 network in the event of a break or of the removal of one of the cords interconnecting two stations.

FIG. 5 shows the topology of the ring network in the event of a cord between two stations being broken or withdrawn, e.g. the cord between the stations S2 and S3. In the downstream self-healing circuit CAV of the station S2, and in the upstream self-healing circuit CAM of the station S3, the relays 6 are switched to the working position. By virtue of the cord being broken or withdrawn, its detection links 12 and 13 are no longer connected to ground, and as a result the detection link 13 takes up the potential +V in the upstream self-healing circuit CAM, and the detection link 12 takes up the potential +V in the downstream self-healing circuit CAV. The control circuits 7 then switch their respective relays 6 to the working position. In the downstream self-healing circuit CAV of the station S2, the moving contact C1 co-operates with the fixed contact a2, and the moving contact C2 co-operates with the fixed contact b1, thereby looping the ring A back via the spare ring AS. Similarly, in the upstream self-healing circuit CAM of the station S3 the moving contact C1 co-operates with the fixed contact a2, and the moving contact C2 co-operates with the fixed contact b1, thereby looping the spare ring AS back on the ring A. Information travels round the spare ring AS in the opposite direction to its direction of travel round the ring A. The stations continue to appear on the ring A in the same direction as before the cord between the stations S2 and S3 was interrupted, the stations on the ring A continue to follow each other in the same order regardless of the direction in which information travels round the ring.

Figure 6:
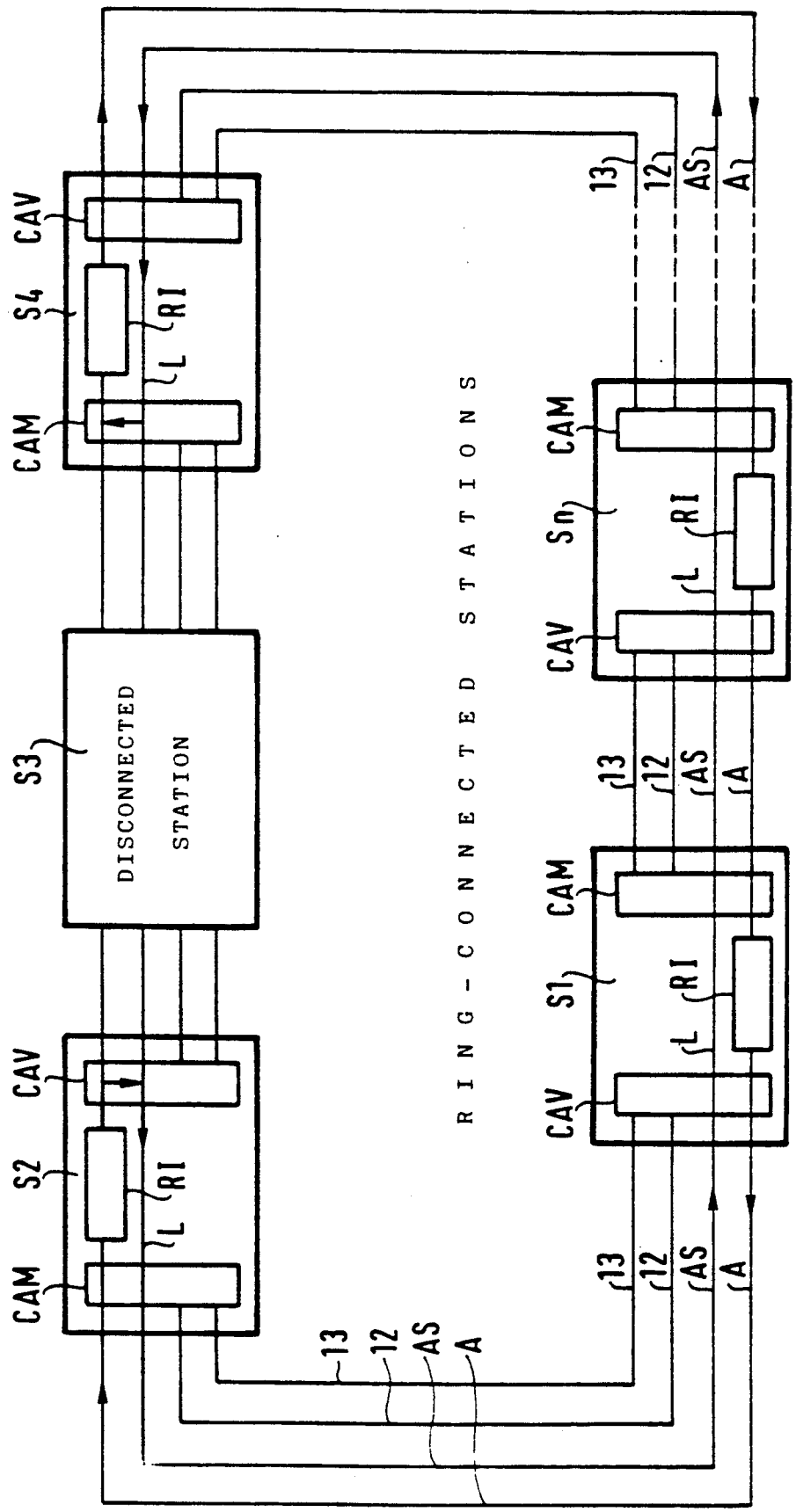
FIG. 6 shows the topology of the FIG. 3 network when a station coupler is withdrawn.

FIG. 6 shows the topology of a network in the event of a station coupler being withdrawn, e.g. the coupler of the station S3 as shown in FIG. 6 where the station S3 is shown as having no coupler. When a coupler is withdrawn, the ring A, the space ring AS and the detection links 12 and 13 with both the preceding station S2 and the following station S4 are all interrupted. As a result, the relay 6 of the downstream self-healing circuit in the preceding circuit S2 takes up its working position, thereby looping the ring A back onto the spare ring AS via its moving contacts C1 and C2, and simultaneously the relay 6 in the upstream self-healing circuit CAM of the following station takes up the working position and loops the spare ring AS back onto the ring A via its moving contacts C1 and C2. In this way, information travels round the spare ring in the opposite direction to its direction of travel round the ring A, with the spare ring AS conveying information directly from station S2 to station S4. Thus, regardless of the direction in which information travels round the ring A, the stations continue to follow one another in the same order with the exception of the station S3 which is removed from the ring network by virtue of its coupler being withdrawn.

FIG. 7 is a diagram of a network having two rings A1 and A2, together with two spare rings AS1 and AS2.

Each of the stations S1 to Sn includes two couplers CS1 and CS2 identical to the coupler CS of FIG. 4. The coupler CS1 is connected to the ring A1, to the spare ring AS1, and to two detection links 12 and 13. The coupler CS2 is connected to the ring A2, to the spare ring AS2, and to two detection links 12' and 13'. The couplers CS1 of two adjacent stations are interconnected by a cord containing the ring A1, the spare ring AS1, and the two detection links 12 and 13. The couplers CS2 of two adjacent stations are interconnected by another cord containing the ring A2, the spare ring AS2, and the two detection links 12' and 13'. Each end of each cord is fitted with a connector for co-operating with a connector on the coupler with which it is connected, as in FIG. 4. In FIG. 7, the spare rings AS1 and AS2 are shown within the stations in order to distinguish them from the rings A1 and A2, since the couplers in each station serve to provide metallic continuity for the spare rings in normal operation, i.e. so long as there is no break or removal of a cord between two stations and so long as none of the couplers is withdrawn at a station.

FIGS. 5 and 6 which show the topology of a one-ring network in the event of a cord break (FIG. 5), and in the event of a coupler being absent (FIG. 6), apply to each of the rings in a two-ring network as shown in FIG. 7, since each of the rings in association with its spare ring has the same configuration as the ring A and the spare ring AS as shown in FIGS. 5 and 6.

In a two-ring link as shown in FIG. 7, breaking or withdrawing a cord or withdrawing a coupler interrupts one of the rings and makes a station inaccessible via the broken ring, but the station continues to be accessible via the other ring, and therefore it can continue to dialog with other stations.

When the broken cord or the withdrawn coupler is replaced, continuity of the broken ring is reestablished and said station again becomes available via said ring.

The self-healing system of the invention thus makes it possible to interchange information between stations in the event of a cord between two stations being broken or withdrawn, or when a station coupler is withdrawn. The operation of the self-healing circuits relies solely on the presence or the absence of the detection links 12 and 13 or 12' and 13' and is independent of the direction in which information travels round the, or each, ring. In the description above, reference is made to preceding or following stations without specifying the direction in which information travels round the, or each, ring. It has therefore been assumed that the stations are numbered arbitrarily, and this assumption is valid so long as all the stations are identical. The terms "upstream" and "downstream" as used for distinguishing between the self-healing circuits of a given station, are used merely for the purpose of facilitating the description, with the upstream circuit being the circuit connected to the preceding station and the downstream station being the circuit connected to the following station.

The self-healing system of the invention thus operates regardless of the direction in which information travels round the ring or round the two rings, and if there are two rings, information may travel in opposite directions round the two rings.

In FIG. 4, the cords connected to the upstream and downstream self-healing circuits are given different reference numerals, but this is merely for the purpose of facilitating the description, and naturally the cords 10 and 11 are identical. In FIG. 7, pairs of adjacent stations are interconnected by two cords identical to the cords 10 and 11.

The self-healing system of the invention makes it possible to extend the number of stations without interrupting interchange between stations, both for the one-ring network as shown in FIG. 3 and for the two-ring network as shown in FIG. 7. Extension consists in adding one or more additional stations to n existing stations. The additional stations may be located anywhere between two other stations, with the problem of extension being independent of the location at which the additional station(s) is/are inserted in the ring.

In order to insert a station between two stations, e.g. between the stations Si and S(i+1), the cord(s) interconnecting these two stations is/are disconnected from one of them, e.g. from the station Si. This disconnection is understood by the stations Si and S(i+1) as being a break in the cord(s) and each ring in the network takes up the configuration shown in FIG. 5, with the stations Si and S(i+1) replacing the stations S2 and S3 in this figure. The additional station is then connected by one or two cords to each of the stations Si and S(i+1), thereby establishing detection links 12 and 13 and 12' and 13' between the station Si and the additional station, and also between the additional station and the station S(i+1). The control circuits 7 in each downstream self-healing circuit of the station Si, in the upstream and downstream self-healing circuits of the additional station, and in each upstream self-healing circuit S(i+1) detect continuity of the detection links and the relay 6 in each of the self-healing circuits is switched so that its moving contacts return to the rest position, thereby re-establishing metallic continuity for each of the rings and for each of the spare rings between the station Si and the additional station, and between the additional station and the station S(i+1). The configuration of the network is then back to the normal operation configuration, be it a one-ring network as shown in FIG. 3 or a two-ring network as shown in FIG. 7.

A station is withdrawn by the opposite operation to extension. The station to be withdrawn is disconnected from the preceding station and from the following station, and said preceding and following stations are interconnected via one or two cords.

In a self-healing circuit, the control circuit 7 thus controls the relay 6 to put its moving contacts into the working position when the detection link which connects the control circuit to the self-healing circuit of another station is broken. This break may occur either because the cord interconnecting the two stations has broken or has been removed, or else because the coupler in the other station has been removed.

The self-healing system of the invention thus makes it possible, for repair or maintenance purposes, to replace a station coupler without thereby interrupting operation of the other stations, and with a two-ring link without even interrupting operation of a station having only one of its couplers removed since that station remains accessible via the other ring. The microbreaks generated by withdrawing or plugging in a coupler are absorbed by the protocol which governs the interchange of information on the ring(s). The system also makes it possible, for capacity extension purposes, to increase the number of stations without preventing those stations which are already in service from operating. The system also makes it possible in the event of a cord interconnecting two stations being broken to maintain operation of all of the stations, both for a one-ring network and for a two-ring network.

I claim:

1. A self-healing system for a ring link system interconnecting a plurality of stations inserted on said ring link system, said ring link system comprising:

main ring link means for transmitting information between any station and any neighboring station in one direction;

spare ring link means for transmitting said information between any station and any next station in a direction opposite to said one direction when said ring link system is interrupted between two stations;

detection links, one for each of said directions, for relaying continuously generated detection signals between a first station and a second neighboring station indicating to said second neighboring station an operative condition of said first station;

each of said plurality of stations comprising:

primary relay means inserted into said main ring link means for relaying information through the station;

secondary relay means inserted into said spare ring link means for relaying information through the station;

switch means connected to said primary relay means and said secondary relay means for switching said information either in a first mode where said information passes through the station by means of said primary relay means or in a second mode where said information is looped back through said primary relay means and said secondary relay means, from said main ring link means, in an output access of the station to said main ring link means, to a spare ring link means input access of the station;

switch means connected to said primary relay means and said secondary relay means for switching said information either in said first mode or in said second mode where said looped back information is looped back through said primary relay means and said secondary relay means, from said spare ring link means, in an output access of the station to said spare ring link means, to a main ring link means input access of the station;

detection signal transmitting means for continuously transmitting a first detection signal along a first of said detection links to subsequent station in said one direction;

detection signal receiving means for receiving a second continuously generated detection signal sent along a second of said detection links from a subsequent station along said main ring link means in said direction opposite to said one direction;

detection signal transmitting means for continuously transmitting said second continuously generated detection signal along said second detection link to a preceding station in said direction opposite to said one direction;

detection signal receiving means for receiving said first detection signal continuously transmitted along said first detection link from said preceding station in said one direction;

control means for controlling said switch means so as to place said switch means in said second mode when said second continuously generated detection signal disappears indicating that an interruption exists in said ring link system between the station and said subsequent station in said one direction along said main ring link means and so as to place said switch means in said first mode otherwise; and control means for controlling said switch means so as to place said switch means in said second mode when said second continuously generated detection signal disappears indicating that an interruption exists in said ring link system between the station and said preceding station in said direction opposite to said one direction along said main ring link means and so as to place said switch means in said first mode otherwise.

2. A self-healing system according to claim 1, wherein said main ring link means includes first and second rings, with each station including first and second couplers, the first couplers of two adjacent stations being interconnected by a first cord and the second couplers of two adjacent stations being interconnected by a second cord.

* * * * *